J. ABSTERDAM.
ROASTING AND SMELTING METALLIC ORES IN VACUO.
No. 3,266. Reissued Jan. 12, 1869
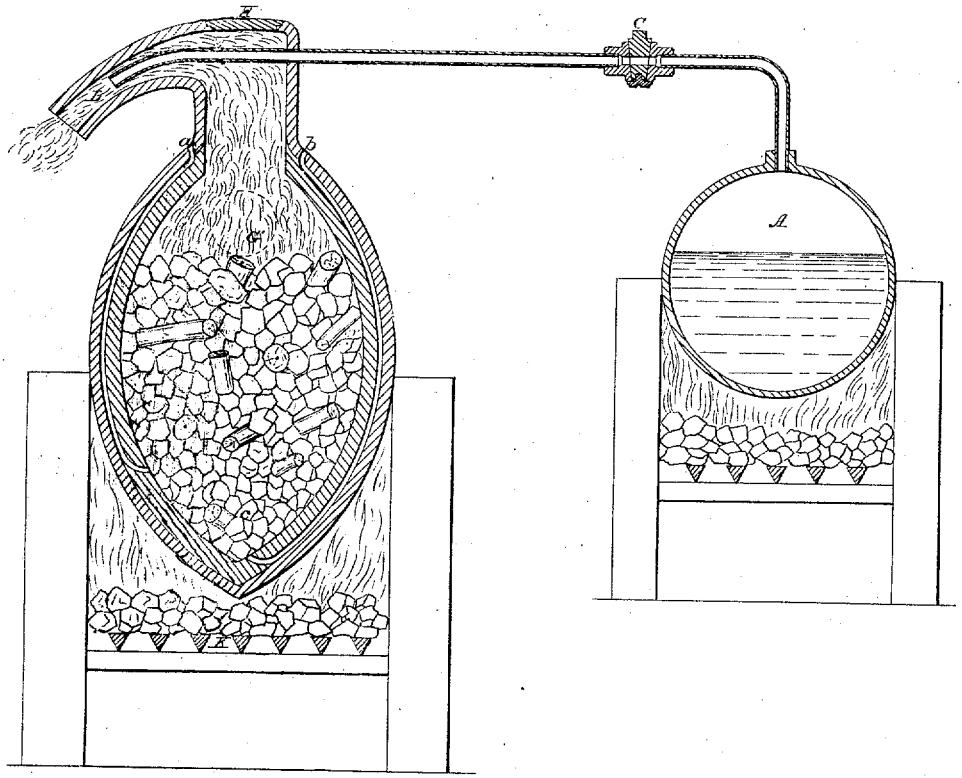
Witnesses,
A. Shedlock.
M. Price
Inventor,
John Absterdam.

United States Patent Office.

THE FIRST NATIONAL ORE-SMELTING AND DESULPHURIZING COMPANY, OF NEW YORK, N. Y., ASSIGNEES OF JOHN ABSTERDAM.

*Letters Patent No.* 52,120, *dated January* 23, 1866; *reissue No.* 3,266, *dated January* 12, 1869.

IMPROVEMENT IN ROASTING AND SMELTING METALLIC ORES IN VACUO.

The Schedule referred to in these Letters Patent and making part of the same.

*To all whom it may concern:*

Be it known that JOHN ABSTERDAM, of the city, county, and State of New York, did invent a new and useful Improvement in Roasting and Smelting Metallic Ores *in vacuo;* and I, ORVILLE M. PHILLIPS, President of the First National Ore-Smelting and Desulphurizing Company, do hereby declare the following to be a full, clear, and exact description thereof, which will enable those skilled in the art to make and use the same.

The nature of this invention consists—

First, in extracting and dilating the impurities contained in ores, when the same are heated in a retort or furnace, by creating and maintaining, within said retort or furnace, a vacuum or partial vacuum.

Second, in supplying the air, for the combustion of the fuel mixed with the ore in the retort or furnace, by creating and maintaining, within said retort or furnace, a vacuum or partial vacuum.

Third, introducing into the retort or furnace containing the ore a hydrocarbon-liquid, vapor, or gas, by creating or maintaining, within said furnace or retort, a vacuum or partial vacuum.

In order that this process may be well understood, a diagram has been made of an apparatus which may be practically employed in carrying out the invention. At the same time the invention is not confined to one particular shape or manner of constructing the apparatus that may be used for carrying out this process.

To enable others skilled in the art to make and use this invention, the process will be described under its various manipulations.

A retort or furnace, capable of being closed air-tight, is first provided, set in a grate-furnace, and provided with an exit-pipe for carrying off the gaseous product in the ordinary manner. A steam-pipe is then introduced in the interior of said exit-pipe, having its end in the direction of the mouth of said exit-pipe, as seen at E.

This steam-pipe conveys a supply of steam from a steam-boiler or generator, A, and is provided with a stop-cock, C, for regulating the flow of steam.

In order to carry out this invention, a commencement is made by filling the retort or furnace with small pieces of wood, sawdust, peat, turf, bog, or coal, together with fragments of metallic ores, in alternate layers. Afterwards lute air-tight the man-hole plate, H, light the fire in the grate-furnace K, under the retort B, and, as soon as gaseous vapors are issuing from the exit-pipe L, open a little the stop-cock C, and let on a small flow of steam in the interior of said exit-pipe, and after the contents of the retort have attained a red heat, let on a greater flow of steam, so as to produce a greater vacuum within the retort, in order to distil the gaseous products *in vacuo*, and after the ores are roasted or reduced in this manner, withdraw all the contents from the retort, which consist of roasted or reduced ores and charcoal, or coke, the gaseous products having been condensed nd retained for illumination or combustion.

If desired, the retort can be charged simply with the ores, or with the ores and chemicals of any suitable nature.

But if the ores are of such a nature as to require a very intense heat for their roasting or reduction, then, instead of withdrawing the contents from the retort, as above stated, simply open the orifices *a b*, which had remained closed during the roasting of the ores, in charring or coking the wood, peat, or coal, and let on a still greater pressure of steam in the exit-pipe, in order to cause a rapid current of air to pass through the red-hot mass in the interior of the retort, thereby burning away the charcoal or coke contained therein, the air entering, of its own accord, through the said orifices *a b*.

In burning away the charcoal or coke so obtained in contact with the ores in the retort, such an intense heat is produced that it will easily roast or reduce the ores that are of the most difficult nature of reducing or roasting, and in this manner, by simply continuing the operation, the ores may be smelted as well as roasted.

When the ores are either roasted or smelted in this manner, the contents of the retort, are also withdrawn, as in the previous operation, and another charge immediately introduced in the retort, and the operation again continued, as before described.

If it should be desired, instead of introducing wood or coal, together with the ores, in the retort, the ores may be introduced alone, and afterward a stream or streams of some hydrocarbon-vapor may be made to pass through the whole mass, by creating or maintaining in the retort a vacuum or partial vacuum, as previously explained, the air required for the combustion of the hydrocarbon-liquid, vapor, or gas being also supplied by the suction produced by the vacuum.

The advantage of this process is as follows, viz:

First, in roasting or smelting ores containing substances capable of dilation or evaporation by heat, their extraction is facilitated by distilling them *in vacuo*.

Second, in producing the blast required for reducing the ores, by creating a vacuum within the retort, instead of forcing the air into it, as done in the ordinary way, a supply of air, with an equalized pressure, is obtained throughout the whole mass, thereby producing an equalized heat, which is a matter of great importance in smelting.

Third, in roasting iron-ores by this process, a sufficient amount of carbon is imparted to the ore in depriving it of its oxygen, which enables one to melt said carbonized ore directly into cast-steel, without any further process of cemetation.

Fourth, in roasting or smelting copper-ores, they are very easily divested of their sulphur, phosphorus, and arsenic.

Fifth, in roasting ores of zinc, tin, lead, bismuth, an timony, &c., they may be roasted, smelted, and oxidized by this process, in one single operation, with great facility. This is a matter of considerable importance in treating those ores containing silver or gold, also, for manufacturing metallic oxides.

Sixth, in smelting lead-ores, where the gaseous vapors generated therefrom are now so deleterious to animal and vegetable life, by this process the whole steam and gas may be condensed together, with any ordinary condenser, thus allowing the incondensable air to escape free from any poisonous substances.

Seventh, all smelting-works have very high chimneys for carrying the deleterious gases out into the atmosphere—a very expensive structure, which is dispensed with altogether by this process.

It is natural to understand, from the above-described process, that a condenser is connected to the exit-pipe when the gaseous products are to be condensed.

Having thus described the invention,

What is claimed as new, and desired to be secured by Letters Patent, is—

1. Extracting or dilating the impurities contained in ores, when the same are heated in a retort or furnace, by creating and maintaining, within said retort or furnace, a vacuum or partial vacuum, substantially as set forth.

2. Supplying the air, for the combustion of the fuel mixed with the ore in the retort or furnace, by creating and maintaining, within the retort or furnace, a vacuum or partial vacuum, substantially as described.

3. Introducing into the retort or furnace containing the ore, a hydrocarbon-liquid, vapor, or gas, by creating and maintaining, within said retort or furnace, a vacuum or partial vacuum, substantially as described.

ORVILLE M. PHILLIPS, *President.*

Witnesses:

W. HAUFF,

ERNEST F. KASTENHUBER.